(12) United States Patent
Wakamatsu (10) Patent No.: US 7,487,634 B2
(45) Date of Patent: Feb. 10, 2009

(54) EXHAUST GAS CONTROL APPARATUS (75) Inventor: Jin Wakamatsu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 354 days.

(21) Appl. No.: 10/594,953

(22) PCT Filed: Dec. 1, 2005

(86) PCT No.: PCT/IB2005/003635

§ 371 (c)(1), (2), (4) Date: Sep. 29, 2006

(87) PCT Pub. No.: WO2006/059219

PCT Pub. Date: Jun. 8, 2006

(65) Prior Publication Data

US 2008/0264050 A1  Oct. 30, 2008

(30) Foreign Application Priority Data

Dec. 2, 2004 (JP) ............................. 2004-350061

(51) Int. Cl.
*F01N 3/00* (2006.01)
*G01M 15/00* (2006.01)

(52) U.S. Cl. .................. 60/297; 60/285; 73/114.76

(58) Field of Classification Search .......... 60/285, 60/297, 311; 73/31.04, 114.69, 114.71, 114.74, 73/114.76

See application file for complete search history.

(56) References Cited

U.S. PATENT DOCUMENTS

| 3,889,536 | A | * | 6/1975 | Sylvester | 73/861.65 |
| 3,934,471 | A | * | 1/1976 | White et al. | 73/861.04 |
| 4,343,194 | A | * | 8/1982 | Dehart et al. | 73/861.65 |
| 6,112,575 | A | * | 9/2000 | Cocconi | 73/23.31 |
| 7,110,878 | B2 | * | 9/2006 | Nakamura et al. | 701/114 |
| 2005/0150213 | A1 | * | 7/2005 | Miyazaki et al. | 60/287 |
| 2007/0044547 | A1 | * | 3/2007 | Zhang | 73/116 |

FOREIGN PATENT DOCUMENTS

| JP | 07-224636 A | 8/1995 |
| JP | 2000-345826 A | 12/2000 |
| JP | 2004-019523 A | 1/2004 |

* cited by examiner

*Primary Examiner*—Thomas E Denion
*Assistant Examiner*—Jonathan Matthias
(74) *Attorney, Agent, or Firm*—Kenyon & Kenyon LLP (57) ABSTRACT

An exhaust gas control apparatus that includes a pressure difference sensor that detects the difference in pressure between the upstream side and the downstream side of a particulate filter (DPNR catalyst), which captures particulate matter that is present in exhaust gas. In the exhaust gas control apparatus, the pipes that introduce the pressure to the pressure difference sensor include an upstream pipe that introduces the pressure on the upstream side of the particulate filter to the pressure difference sensor. The upstream pipe includes an expanded pipe portion, which has an inner diameter greater than that of the portion of the upstream pipe near the pressure difference sensor, near the particulate filter. With this configuration, the deposition of particulate matter, soot, soluble organic fractions, and the like in the upstream pipe is suppressed, which minimizes clogging of the upstream pipe.

12 Claims, 4 Drawing Sheets

EXHAUST GAS CONTROL APPARATUS

INCORPORATION BY REFERENCE

This is a 371 national phase application of PCT/IB2005/003635 filed 01 Dec. 2005, claiming priority to Japanese Patent Application No. 2004-350061 filed 02 Dec. 2004, the contents of which are incorporated herein by reference.

BACKGROUND OF THE INVENTION

1. Field of the Invention

The invention relates to an apparatus that purifies exhaust gas discharged from an internal combustion engine. More particularly, the invention relates to an exhaust gas control apparatus that purifies exhaust gas discharged from a diesel engine using a particulate filter.

2. Description of the Related Art

Exhaust gas is discharged from internal combustion engines, such as gasoline engines and diesel engines, when they are operating. The exhaust gas contains substances that should not be discharged to the atmosphere. Particularly, exhaust gas discharged from diesel engines contains particulate matter (hereinafter, referred to as "PM") that mainly contains carbon, soot, and soluble organic fractions (SOF). The PM, soot, and SOF cause air pollution.

Exhaust gas control apparatuses that remove PM contained in exhaust gas are known. Typically, such exhaust gas control apparatuses reduce the amount of PM discharged into the atmosphere from a diesel engine by passing the exhaust gas through a particulate filter provided in the exhaust passage and capturing the PM in the filter. Appropriate particulate filters used in such apparatuses may include, for example, diesel particulate filters (DPF) or diesel particulate-NOx reduction system (DPNR) catalysts.

The particulate filter becomes clogged as the amount of PM deposited on the particulate filter increases, which increases the pressure loss of exhaust gas passing through the particulate filter makes it more difficult for the exhaust gas to pass through the particulate filter. This increases exhaust back pressure in the engine, which reduces the output and fuel efficiency of the engine.

In order to solve these problems, the particulate filter is recovered by burning and removing the PM on the particulate filter in conventional exhaust gas control apparatuses. To burn and remove the PM on the particulate filter, for example, the amount of PM captured by the particulate filter (i.e., the amount of PM deposited on the particulate filter) must be determined. When the amount of PM captured by the particulate filter reaches a certain level, the temperature of the exhaust gas is increased. Also for example, Japanese Patent Application Publication No. JP 07-224636 A (hereinafter, referred to as "JP 07-224636 A"), Japanese Patent Application Publication No. JP 2004-019523 A (hereinafter, referred to as "JP 2004-019523 A"), and Japanese Patent Application Publication No. JP 2004-285882 A (hereinafter, referred to as "JP 2004-285882 A") disclose a method of deciding the timing for recovering the particulate filter. In the method, a pressure difference sensor or the like detects the difference between the pressure on the upstream side and the pressure on the downstream sidle of the particulate filter, and the particulate filter is recovered when the detected pressure difference (the estimated amount of PM deposited on the particulate filter) exceeds a predetermined value.

In the exhaust gas control apparatus disclosed in each of JP 07-224636 A, JP 2004-019523 A, and JP 2004-285882 A, an upstream pipe and a downstream pipe are connected to a portion on the upstream and a portion on the downstream of the particulate filter, respectively. The pressure upstream and downstream of the particulate filter is introduced into the pressure difference sensor or the like through the upstream pipe and the downstream pipe.

In this configuration, the PM, soot, and SOF in exhaust gas enter the upstream pipe (pressure introduction pipe). The PM, soot, and SOF are deposited in the upstream pipe, which clogs the upstream pipe. Particularly, when soot is deposited, hydrocarbon (HC) that is unburned fuel in exhaust gas functions as a binder. Further, the exhaust gas is repeatedly pushed from a pressure inlet port of the upstream pipe toward the pressure difference sensor or the like, due to the pulsation of the exhaust gas pressure. As a result, a bent portion of the upstream pipe close to the pressure inlet port will very likely become clogged.

JP 07-224636 A discloses a method for preventing clogging of the pressure introduction pipe (upstream pipe). This method minimizes the amount of PM that enters the pressure introduction pipe due to the pulsation of the exhaust gas pressure by connecting the pressure introduction pipe to an exhaust pipe via pulsation-absorbing chamber. In this method, the pulsation-absorbing chamber, which generally has a complicated stricture, is required. This makes mass production difficult and also increases production cost. JP 07-224636 A also discloses a method for reducing the amount of PM that adheres to or is deposited in the pressure introduction pipe. In this method, the adhesion and deposition of the PM is reduced by inserting an end portion of the pressure introduction pipe into the exhaust pipe, which keeps the temperature of the end portion high using the heat of the exhaust gas. In this method, the structure for connecting the pressure introduction pipe to the exhaust pipe is complicated, which also makes mass production difficult, and increases production cost.

SUMMARY OF THE INVENTION

In view of the above, it is an object of the invention to minimize clogging of a pressure introduction pipe (upstream pipe) with a simple configuration in an exhaust gas control apparatus. The apparatus detects the difference in the pressure upstream and downstream of the particulate filter, or checks the function of the exhaust gas control apparatus using an on-board diagnostic system (OBD system) to determine the appropriate timing for recovering a particulate filter.

An aspect of the invention relates to an exhaust gas control apparatus that includes a particulate filter, which captures PM in exhaust gas, provided in an exhaust passage and a pressure difference detection means for detecting the difference in pressure upstream and downstream of the particulate filter. In the exhaust gas control apparatus, pipes that introduce the pressure to the pressure difference detection means are provided. The pipes include an upstream pipe that introduces the pressure on the upstream side of the particulate filter to the pressure difference detection means. In addition, the portion of the upstream pipe near the particulate filter is expanded such that the inner diameter of the expanded portion is greater than that of the portion of the upstream pipe near the pressure difference detection means.

In the aspect of the invention, the upstream pipe includes the expanded portion near the particulate filter, i.e., a pressure inlet port. That is, the expanded portion is provided between the pressure inlet port and the portion near the pressure detection means. The expanded portion also increases the volume of the upstream pipe. Accordingly, even if exhaust gas is repeatedly pushed into the upstream pipe due to the pulsation of the exhaust gas pressure, the flow of the exhaust gas can be stopped in the expanded portion, and entrance of exhaust gas into the portion near the pressure detection means (for example, a sensor-side pipe 52 in FIG. 2) can be minimized. This suppresses deposition of PM, soot and SOF (hereinafter, collectively referred to as "PM") in the upstream pipe, which minimizes clogging of the upstream pipe. Further, by providing the expanded portion near the pressure inlet port, the distance that the exhaust gas flows in the upstream pipe can be reduced. This can reduce the length of the entire upstream pipe, which reduces the proportion of the piping space to the total space of the engine compartment. Also, the clogging of the upstream pipe can be minimized using a simple configuration, without the need for an additional member having a complicated structure, such as a pulsation absorbing chamber, in the exhaust manifold, the pressure intake portion of the exhaust pipe, or the like, which would also otherwise need to be heat-resistant and durable.

A bent portion may be provided in the expanded portion of the upstream pipe, which minimizes entrance of PM into a portion on the downstream side (i.e., on the pressure detection means side) of the bent portion in the expanded portion.

The expanded pipe portion of the upstream pipe may include a bent portion located in the first position where the upstream pipe is bent in a direction from a pressure inlet port on the side of the particulate filter toward the pressure difference detection means. That is, the expanded pipe portion may include the bent portion where the PM is most likely to be deposited. This configuration can minimize the deposition of the PM more effectively. The bent portion may be formed by bending the upstream pipe at an angle of 90 degrees or greater, which minimizes entrance of the PM into the portion on the downstream side of the bent portion even more effectively.

The upstream pipe may further include a short pipe on the upstream side of the expanded portion, which has an inner diameter and an outer diameter equal to that of a downstream pipe. With this configuration, the upstream pipe can be connected to the particulate filter using the same fitting member as that used for connecting the downstream pipe to the particulate filter, which reduces cost.

A connection portion between the expanded pipe portion and the portion of the upstream pipe near the pressure difference sensor may have a conical shape so that the inner diameter of the upstream pipe gradually changes. With this configuration, the inner surface of the connection portion is smooth, which suppresses the deposition of the PM.

Thus, according to the invention, pipes that introduce the pressure to the pressure difference detection means are provided; the pipes include an upstream pipe that introduces the pressure on the upstream side of the particulate filter to the pressure difference detection means; and the upstream pipe includes an expanded pipe portion near the particulate filter, which has an inner diameter greater than that of a portion of the upstream pipe near the pressure difference detection means. This configuration suppresses the deposition of the PM inside the upstream pipe, which minimizes clogging of the upstream pipe. Thus, the difference between the pressure on the upstream side and the pressure on the downstream side of the particulate filter can be accurately detected, which leads to an accurate determination of the timing for recovering the particulate filter.

BRIEF DESCRIPTION OF THE DRAWINGS

The features, advantages thereof, and technical and industrial significance of this invention will be better understood by reading the following detailed description of exemplary embodiments of the invention, when considered in connection with the accompanying drawings, in which.

DETAILED DESCRIPTION OF THE EXEMPLARY EMBODIMENTS

In the following description and accompanying drawings, the invention will be described in more detail in terms of exemplary embodiments.

Figure 1:
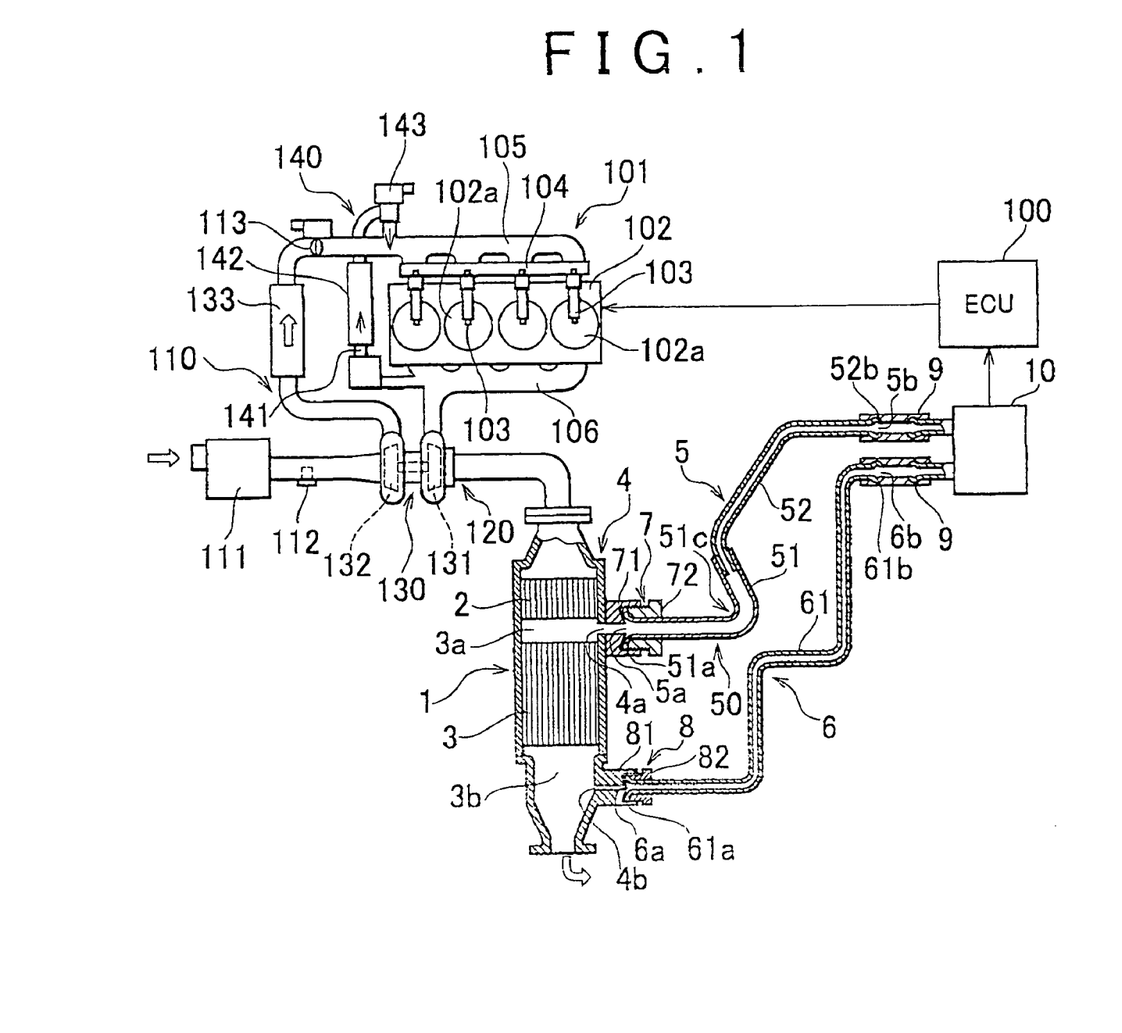
FIG. 1 schematically illustrates a diesel engine to which an exhaust gas control apparatus in an example embodiment is applied.

FIG. 1 schematically illustrates a diesel engine to which an exhaust gas control apparatus according to the invention is applied.

First, the outline configuration of the diesel engine will be described with reference to FIG. 1. For example, a diesel engine (hereinafter, referred to as "engine") 101 is a four-cylinder direct-injection engine. The engine 101 includes injectors 103. Each injector 103 directly injects fuel into the combustion chamber of a corresponding cylinder 102*a* of an engine body 102. The injectors 103 are connected to a common rail (accumulator) 104. A high-pressure fuel pump (not shown) supplies fuel to the common rail 104. By opening each injector 103 according to a predetermined timing, fuel is injected into the combustion chamber of the corresponding cylinder 102*a* of the engine body 102. The fuel injected is burned in the combustion chamber, and then exhaust gas is discharged. The engine 101 is provided with a coolant sensor (not shown) that detects the temperature of the engine coolant.

The engine body 102 is connected to an intake manifold 105 and an exhaust manifold 106. The intake manifold 105 is connected to an intake pipe 110. The exhaust manifold 106 is connected to an exhaust pipe 120. The exhaust manifold 106 may be provided with an oxygen sensor (not shown) that detects the concentration of oxygen in exhaust gas.

The intake pipe 110 is provided with an air cleaner 111, a heat wire air flow meter 112 (including an intake air temperature sensor therein), and an electronically-controlled throttle valve 113. The electronically-controlled throttle valve 113 adjusts the amount of air taken into the engine 101. The exhaust pipe 120 of the engine 101 is provided with an exhaust gas control apparatus 1 in the embodiment of the invention.

The engine 101 is provided with a turbo charger 130 that supercharges intake air using the exhaust gas pressure. The turbocharger 130 includes a turbine 131 and a compressor 132. The turbine 131 is provided in the exhaust pipe 120. The compressor 132 is provided in the intake pipe 110. The turbine 131 provided in the exhaust pipe 120 is rotated by energy of the exhaust gas, which rotates the compressor provided in the intake pipe 110. The rotation of the compressor 132 supercharges the intake air, and forcibly delivers the air into the combustion chamber of each cylinder 102*a* of the engine 101. In the intake pipe 110, an intercooler 133 is provided between the compressor 132 and the throttle valve 113. The intercooler 133 cools the high-temperature intake air that is compressed by the compressor 132.

The engine 101 is provided with an EGR device 140. The EGR device 140 reduces the amount of generated NOx by reducing the burning temperature in the combustion chamber by introducing part of the exhaust gas into the intake air. The EGR device 140 includes an EGR passage 141, an EGR cooler 142, and an EGR valve 143. The EGR passage 141 connects the intake pipe 110 to the exhaust pipe 120. The EGR cooler 142 and the EGR valve 143 are provided in the EGR passage 141. By adjusting the opening amount of the EGR valve 143, the amount of EGR gas can be adjusted. The EGR gas is exhaust gas that flows back from the exhaust manifold 106 to the intake manifold 105.

The exhaust gas control apparatus 1 includes an upstream catalyst 2 and a DPNR catalyst (particulate filter) 3. The upstream catalyst 2 is provided upstream of the DPNR catalyst 3. The upstream catalyst 2 has the capacity less than that of the DPNR catalyst 3. Even when the engine starts, heat of exhaust gas increases the temperature of the upstream catalyst 2 quickly, which help activate the upstream catalyst 2 quickly. The upstream catalyst 2 needs to have an oxidizing function. Examples of the upstream catalyst 2 include a NOx storage reduction catalyst, an oxidation catalyst, and a three-way catalyst.

For example, in the DPNR catalyst 3, the NOx storage reduction catalyst is supported by a porous ceramic structure. The DPNR catalyst 3 captures the PM in the exhaust gas passing through the porous wall of the DPNR catalyst 3. When the air-fuel ratio of the exhaust gas is lean, the NOx storage reduction catalyst stores NOx present in the exhaust gas. When the air-fuel ratio is rich, the NOx storage reduction catalyst reduces and releases NOx. Further, the DPNR catalyst 3 supports another catalyst that oxidizes and burns the PM captured. An example of the Catalyst is an oxidation catalyst that mainly contains noble metal such as platinum.

The upstream catalyst 2 and the DPNR catalyst 3 are provided at a predetermined interval in a casing 4. The casing 4 is provided with a pressure intake port 4a and an upstream flared tube fitting 7. Exhaust gas flows from an upstream side 3a of the DPNR catalyst 3 to the pressure intake port 4a. A fitting body 71 of the upstream flared tube fitting 7 is fixed to the casing 4. Also, the casing 4 is provided with a pressure intake port 4b and a downstream flared tube fitting 8. The exhaust gas flows from a downstream side 3b of the DPNR catalyst 3 to the pressure intake port 4b. A fitting body 81 of the downstream flared tube fitting 8 is formed integrality with the casing 4.

The upstream flared tube fitting 7 is connected to an upstream pipe 5 through which the pressure is introduced to the pressure difference sensor 10. The downstream flared tube fitting 8 is connected to a downstream pipe 6 through which the pressure is introduced to the pressure difference sensor 10. The exhaust gas flows from the upstream side 3a of the DPNR catalyst 3 to the upstream pipe 5. The exhaust gas flows from the downstream side 3b of the DPNR catalyst 3 to the downstream pipe 6. The upstream pipe 5 and the downstream pipe 6 will be described in detail later.

The upstream pipe 5 is connected to the upstream flared tube fitting 7 by screwing a flare nut 72 into the fitting body 71 when a flare 51a formed in an end portion of the upstream pipe 5 (i.e., end portion on a pressure inlet port 5a side) is placed in the fitting body 71. The downstream pipe 6 is connected to the downstream flared tube fitting 8 by screwing a flare nut 82 into the fitting body 81 while a flare 61a formed in an end portion of the downstream pipe 6 (i.e., end portion on a pressure inlet port 6a side) is placed in the fitting body 81.

The other end portion of the upstream pipe 5 (i.e., end portion on a sensor side) is connected to the pressure difference sensor 10 via a pipe fitting 9 having a sleeve shape. The other end portion of the downstream pipe 6 (i.e., end portion on the sensor side) is connected to the pressure difference sensor 10 via another pipe fitting 9. The pressure difference sensor 10 detects the difference between the pressure introduced through the upstream pipe 5 and the pressure introduced through the downstream pipe 6. An electronic control unit (ECU) 100 receives detection signals indicating the detected pressures from the pressure difference sensor 10.

The ECU 100 includes a CPU, ROM, RAM, and back-up RAM (none of them are shown). The ROM stores different control programs, maps that are used for executing the control programs, and the like. The CPU executes computations based on the control programs and maps stored in the ROM. The RAM temporarily stores the results of the computations executed by the CPU, data input from each sensor, and the like. The back-up RAM is nonvolatile memory. The back-up RAM stores data and the like that need to be stored when the engine 101 is not running. The ECU 100 controls the diesel engine 101 based on detection signals transmitted from the sensors such as the air flow meter 112, the intake air temperature sensor, the coolant temperature sensor, and the oxygen sensor.

Also, the ECU 100 estimates the amount of PM captured and deposited in the DPNR catalyst 3 based on the pressure difference detected by the pressure difference sensor 10. When the estimated amount of PM becomes equal to or greater than a predetermined reference value (limit value), the ECU 100 determines that the DPNR catalyst 3 should be recovered, and executes a recovery process for the DPNR catalyst 3. Or the ECU 100 determines whether the pressure difference is normal based on the estimated amount.

In an example of the recovery process for the DPNR catalyst 3, the temperature of exhaust gas is increased to a temperature range where the PM deposited in the DPNR catalyst 3 is burned. In another example of the recovery process, the temperature of the DPNR catalyst 3 is increased to a temperature range where the PM is burned, using a heater provided in the DPNR catalyst 3. The reference value (limit value) used in the determination of the timing for recovering the DPNR catalyst 3 is obtained in advance through calculation, experiment, or the like.

Next, the upstream pipe 5 and the downstream 6 of the exhaust gas control apparatus 1 will be described. As shown in FIG. 1, the downstream pipe 6 is composed of a pipe (for example, stainless pipe) 61. The pipe 61 has a constant inner diameter from the pressure inlet port 6a to an outlet port 6b. The flare 61a is formed in the end portion of the pipe 61 on the pressure inlet port 6a side. A spool 61b for connection with the tube fitting 9 is formed in the end portion of the pipe 61 on the outlet port 6b side.

Figure 2:
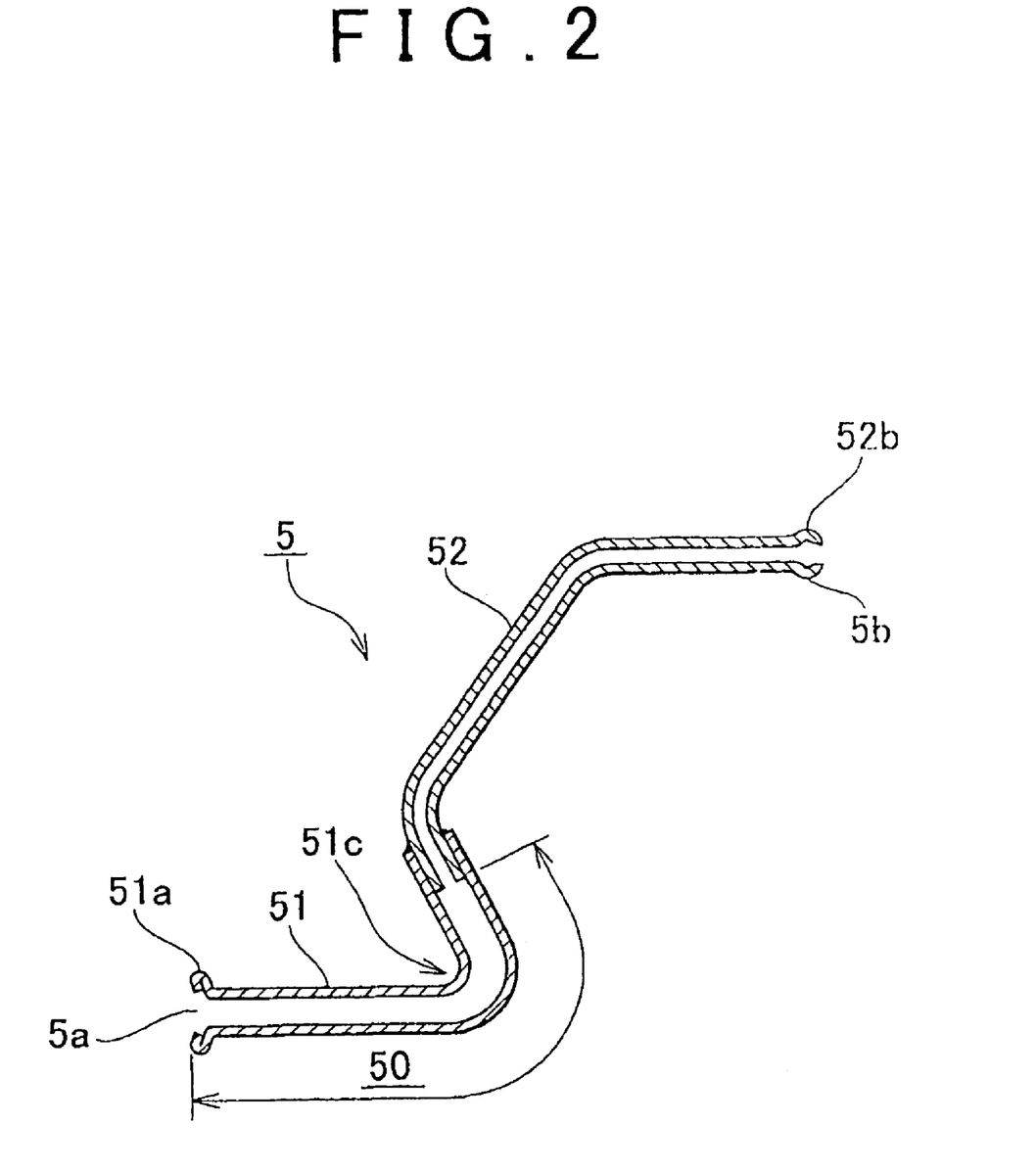
FIG. 2 illustrates a sectional view of the upstream pipe of the exhaust gas control apparatus shown in FIG. 1.

As shown in FIG. 1 and FIG. 2, the upstream pipe 5 is composed of a sensor-side pipe (for example, stainless pipe) 52 and a filter-side pipe (for example, stainless pipe) 51. The sensor-side pipe 52 has an inner diameter equal to that of the pipe 61 constituting the downstream pipe 6. The filter-side pipe 51 has an inner diameter greater than that of the sensor-side pipe 52. The sensor-side pipe 52 and the filter-side pipe 51 are connected to each other by inserting and brazing an end portion of the sensor-side pipe 52 into an end portion of the filter-side pipe 51. The inner diameter of the filter-side pipe 51 is substantially equal to the outer diameter of the sensor-side pipe 52.

The flare 51a is formed in the other end portion of the filter-side pipe 51. The filter-side pipe 51 is connected to the upstream flared tube fitting 7 so that the exhaust gas flows from the upstream side 3a of the DPNR catalyst 3 to the filter-side pipe 51. By connecting the filter-side pipe 51 to the upstream flared tube fitting 7, an expanded pipe portion 50 is provided near the DPNR catalyst 3 (i.e., near the pressure inlet port 5a).

Further, the expanded pipe portion 50 of the upstream pipe 5 includes a first bent portion 51c, the bent portion that is located in the first position where a pressure introduction passage is bent extending from the pressure inlet port 5a toward the pressure difference sensor 10. The bent portion 51c may be bent at an angle of 90 degrees or greater. A spool 52b for connecting the pipe with the pipe fitting 9 is formed in the end of the sensor-side pipe 52 (i.e., the end portion on the outlet port 5b side).

An upstream pipe 5 having the aforementioned structure thus has the expanded pipe portion 50 near the pressure inlet port 5a, which reduces the distance that exhaust gas flows in the upstream pipe 5, for the following reason.

Figure 3A:
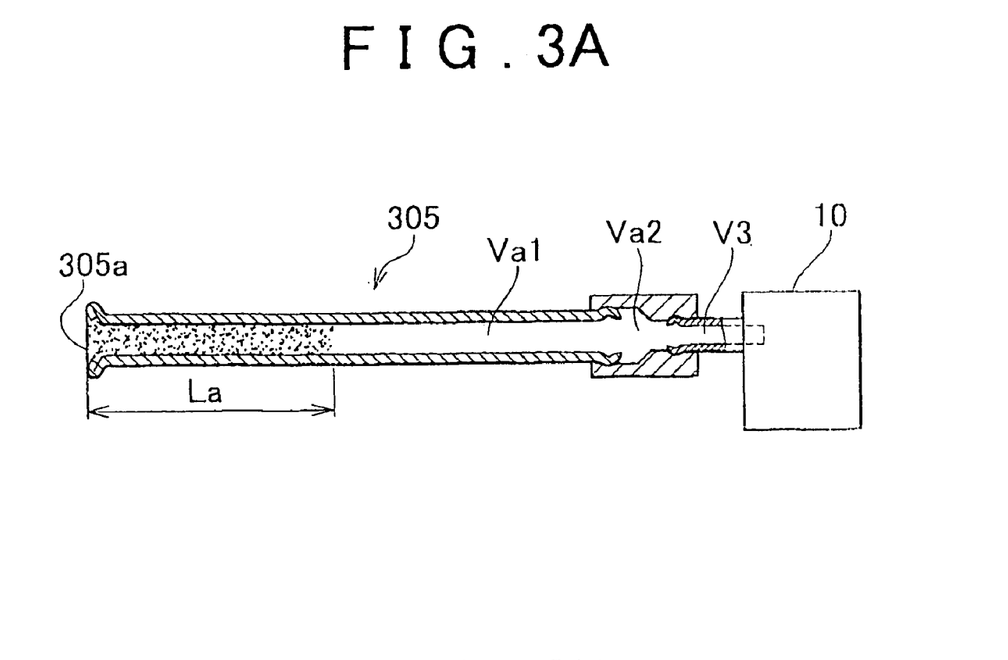
FIG. 3A illustrates a diagram explaining the effect of the example embodiment of the invention.
Figure 3B:
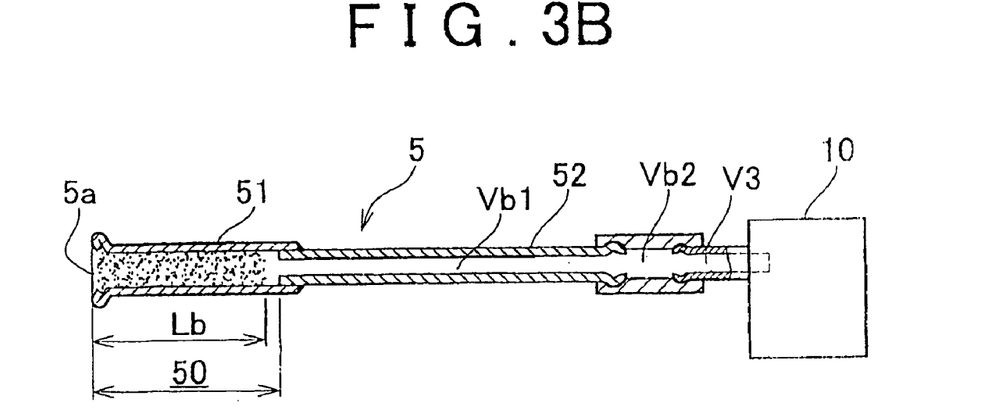
FIG. 3B illustrates another diagram explaining the effect of the example embodiment of the invention.

FIG. 3A shows the case where the inner diameter along the entire length of an upstream pipe 305 is greater than that of the sensor-side pipe 52 of the upstream pipe 5. In this case, a volume Va of the pressure introduction passage extending from a pressure inlet port 305a toward the pressure difference sensor 10 is represented by an equation, Va=Va1+Va2+V3. FIG. 3B shows the case where the inner diameter of the upstream pipe 5 is increased at the portion near the pressure inlet port 5a. In this case, a volume Vb of the pressure introduction passage is represented by an equation, Vb=Vb1+Vb2+V3. As apparent from FIG. 3A and FIG. 3B, Va is greater than Vb (Va>Vb; Va1>Vb1, Va2>Vb2). Therefore, if the same pressure $\Delta P$ (pulsation) is applied to the upstream pipe 305 and the upstream pipe 5, a greater amount of exhaust gas flows into the upstream pipe 305, where the inner diameter along the entire length of the upstream pipe is greater than that of the sensor-side pipe 52 of the upstream pipe 5. Therefore, as shown in FIG. 3A, exhaust gas flows for a distance La in the upstream pipe 305. In contrast, in the upstream pipe 5 where the inner diameter is increased at the portion near the pressure inlet port 5a, exhaust gas flows only for a distance Lb (Lb<La), as shown in FIG. 3B.

Thus, by increasing the inner diameter of the upstream pipe 5 only at the portion near the pressure inlet port 5a, the distance that exhaust gas flows in the upstream pipe 5 can be reduced. This allows the reduction of the length of the entire upstream pipe 5, which reduces the number of the bent portions where clogging tends to occur, and reduces the proportion of the piping space to the total space of the engine compartment.

The expanded pipe portion 50 of the upstream pipe 5 in this embodiment includes the bent portion where the PM is most likely to be deposited in the pressure introduction passage extending from the pressure inlet port 5a on the side of the DPNR catalyst 3 toward the pressure difference sensor 10. That is, the expanded pipe portion 50 includes the first bent portion 51c closest to the DPNR catalyst 3 in the pressure introduction passage, which minimizes entrance of the PM into the portion on the downstream side (i.e., on the pressure difference sensor 10 side) of the first bent portion 51c, and reduces the distance that the PM flows. Further, by bending the first bent portion 51c at an angle of 90 degrees or greater, the entry of PM into the portion on the downstream side of the first bent portion 51c is effectively minimized.

Figure 4:
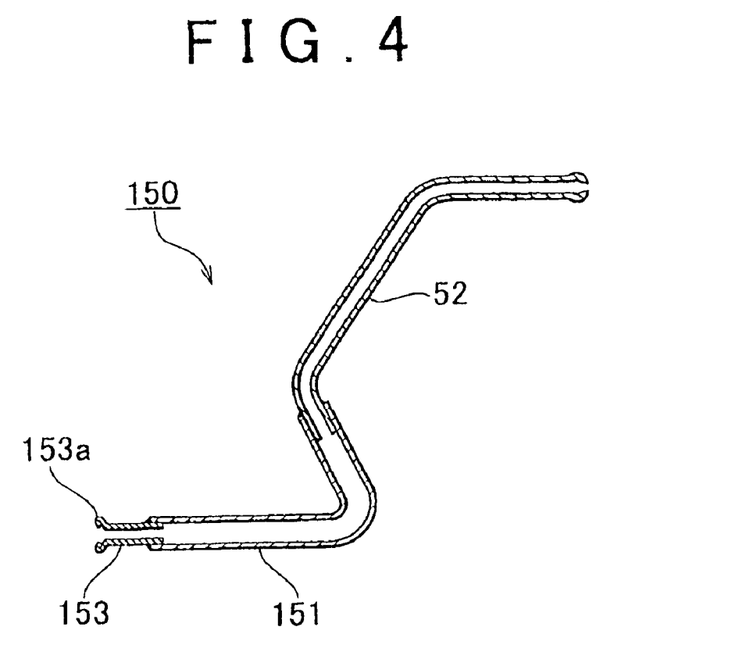
FIG. 4 illustrates a sectional view showing another example of the upstream pipe.

Next, other examples of the upstream pipe will be described with reference to FIG. 4 and FIG. 5. In FIG. 4, an upstream pipe 150 is shown. The upstream pipe 150 is an alternative configuration that corresponds to the upstream pipe 5 shown in FIG. 2. In the configuration of upstream pipe 150, one end of a short pipe 153, which has an inner diameter equal to that of the downstream pipe 6 (refer to FIG. 1), is connected to an end portion of a filter-side pipe 151, and a flare 153a is formed in the other end portion of the short pipe 153. With this configuration, the same flared tube fitting can be used as the upstream flared tube fitting 7 and the downstream flared tube fitting 8 shown in FIG. 1, which reduces cost.

Figure 5:
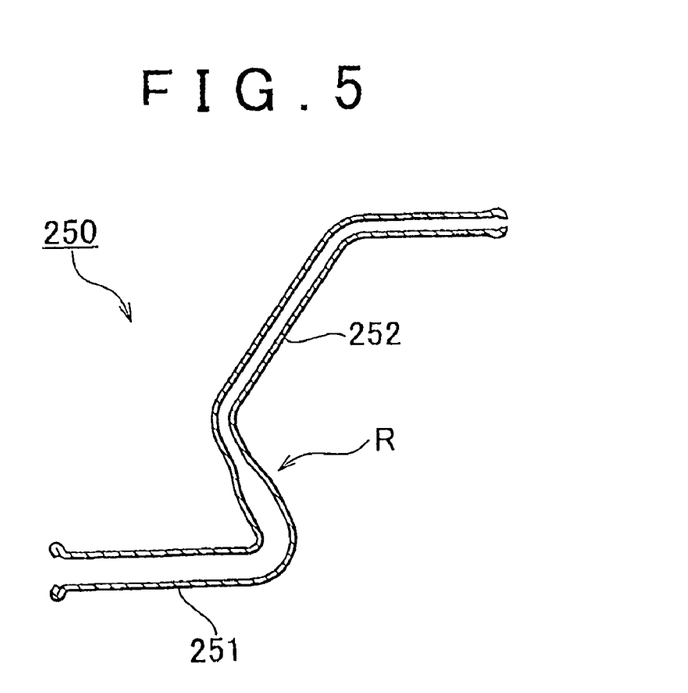
FIG. 5 illustrates a sectional view showing another example of the upstream pipe.

In an upstream pipe 250 as shown in FIG. 5, a conical portion R, where the diameter of the upstream pipe changes, is provided between a sensor-side pipe 252 and a filter-side pipe 251 having a diameter greater than that of the sensor-side pipe 252. With this configuration, the inner surface of the conical portion R between the filter-side pipe 251 and the sensor-side pipe 252 is smooth, which suppresses deposition of the PM in the conical portion R.

In the aforementioned embodiments, a DPNR catalyst is used as the particulate filter. However, the invention is not limited to this configuration. The invention may be applied to an exhaust gas control apparatus using DPF.

In the aforementioned embodiments, the exhaust gas control apparatus according to the invention is applied to a four-cylinder direct-injection diesel engine. However, it should be understood that the full scope of the invention is not limited to four-cylinder direct-injection diesel engines. For example, the invention may be applied to a diesel engine having any number of cylinders, for example, such as six-cylinder direct-injection diesel engine. Also, the invention is not limited to direct-injection diesel engines. The invention may also be applied to other types of diesel engines.

The invention suppresses clogging in the pressure introduction pipe (upstream pipe) of the exhaust gas control apparatus, which determines the timing for recovering the particulate filter, by detecting the difference in pressure between the upstream side and the downstream side of the particulate filter.

An exhaust gas control apparatus (1) that includes a pressure difference sensor (10) that detects the difference in pressure between the upstream side (3a) and the downstream side (3b) of a particulate filter (DPNR catalyst) (3), which captures particulate matter that is present in exhaust gas. In the exhaust gas control apparatus, the pipes that introduce the pressure to the pressure difference sensor (10) include an upstream pipe (5) that introduces the pressure on the upstream side (3a) of the particulate filter (3) to the pressure difference sensor (10). The upstream pipe (5) includes an expanded pipe portion (50), which has an inner diameter greater than that of the portion of the upstream pipe (5) near the pressure difference sensor (10), near the particulate filter (3). With this configuration, the deposition of particulate matter, soot, soluble organic fractions, and the like in the upstream pipe (5) is suppressed, which minimizes clogging of the upstream pipe (5).

The invention claimed is:

1. An exhaust gas control apparatus, comprising:
   a particulate filter that is provided in an exhaust passage and captures particulate matter present in exhaust gas;
   pressure difference detection means for detecting a difference in pressure on an upstream side and on a downstream side of the particulate filter; and
   pipes that introduce the pressures to the pressure difference detection means, wherein
   the pipes include an upstream pipe that introduces the pressure on the upstream side of the particulate filter to the pressure difference detection means, and the upstream pipe includes an expanded pipe portion near the particulate filter, and the expanded pipe portion has an inner diameter greater than that of a portion of the upstream pipe near the pressure difference detection means.

2. The exhaust gas control apparatus according to claim 1, wherein the expanded pipe portion of the upstream pipe includes a bent portion.

3. The exhaust gas control apparatus according to claim 1, wherein the expanded pipe portion of the upstream pipe includes a bent portion that is located in a first position where the upstream pipe is bent in a direction from a pressure inlet port on a side of the particulate filter toward the pressure difference detection means.

4. The exhaust gas control apparatus according to claim 2, wherein the bent portion of the upstream pipe is bent at an angle of 90 degrees or greater.

5. The exhaust gas control apparatus according to claim 1, wherein the upstream pipe further includes a short pipe positioned on an upstream side of the expanded pipe portion, which has an inner diameter and an outer diameter equal to those of a downstream pipe that introduces the pressure on the downstream side of the particulate filter to the pressure difference detection means.

6. The exhaust gas control apparatus according to claim 1, wherein a connection portion between the expanded pipe portion and the portion of the upstream pipe near the pressure difference detection means has a conical shape so that the inner diameter of the upstream pipe gradually changes.

7. An exhaust gas control apparatus comprising:
a particulate filter provided in an exhaust passage, which captures particulate matter in exhaust gas;
a pressure difference sensor that detects a difference in pressure between on an upstream side and on a downstream side of the particulate filter;
an upstream pipe that introduces the pressure on the upstream side of the particulate filter to the pressure difference detection sensor; and
a downstream pipe that introduces the pressure on the downstream side of the particulate filter to the pressure difference sensor, wherein
the upstream pipe includes an expanded pipe portion near the particulate filter, wherein the expanded pipe portion has an inner diameter greater than that of a portion of the upstream pipe near the pressure difference sensor.

8. The exhaust gas control apparatus according to claim 7, wherein the expanded pipe portion of the upstream pipe includes a bent portion.

9. The exhaust gas control apparatus according to claim 7, wherein the expanded pipe portion of the upstream pipe includes a bent portion that is located in the first position where the upstream pipe is bent in a direction from a pressure inlet port on a side of the particulate filter toward the pressure difference detection means.

10. The exhaust gas control apparatus according to claim 8, wherein the bent portion of the upstream pipe is bent at an angle of 90 degrees or greater.

11. The exhaust gas control apparatus according to claim 7, wherein the upstream pipe further includes a short pipe positioned on an upstream side of the expanded pipe portion, which has an inner diameter and an outer diameter equal to those of the downstream pipe.

12. The exhaust gas control apparatus according to claim 7, wherein a connection portion between the expanded pipe portion and the portion of the upstream pipe near the pressure difference sensor has a conical shape so that the inner diameter of the upstream pipe gradually changes.

\* \* \* \* \*

UNITED STATES PATENT AND TRADEMARK OFFICE
CERTIFICATE OF CORRECTION

PATENT NO. : 7,487,634 B2  
APPLICATION NO. : 10/594953  
DATED : February 10, 2009  
INVENTOR(S) : Jin Wakamatsu

Page 1 of 1

It is certified that error appears in the above-identified patent and that said Letters Patent is hereby corrected as shown below:

| Column | Line | |
|---|---|---|
| 1 | 61 | Change "sidle" to --side--. |
| 2 | 24 | Change "stricture" to --structure--. |
| 5 | 36 | Change "Catalyst" to --catalyst--. |
| 5 | 49 | Change "integrality" to --integrally--. |

Signed and Sealed this

Twenty-eighth Day of July, 2009

JOHN DOLL  
*Acting Director of the United States Patent and Trademark Office*